United States Patent [19]

Clendening, Jr. et al.

[11] Patent Number: 6,165,424
[45] Date of Patent: *Dec. 26, 2000

[54] WATER VAPOR TRAP AND LIQUID SEPARATOR FOR SINGLET-DELTA OXYGEN GENERATOR

[75] Inventors: Charles W. Clendening, Jr., Torrance; Jeffrey S. Hartlove, San Pedro; Robert J. Day, Rolling Hills Estates, all of Calif.

[73] Assignee: TRW Inc., Redondo Beach, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/890,717

[22] Filed: Jul. 9, 1997

[51] Int. Cl.[7] .............................. F28D 7/00; C01B 13/00; B03B 7/00
[52] U.S. Cl. ......................... 422/235; 422/234; 423/579; 239/433; 239/434
[58] Field of Search ............................... 423/579; 372/89; 422/187, 198, 234, 235, 129; 239/433, 434

[56] References Cited

U.S. PATENT DOCUMENTS

| | | | |
|---|---|---|---|
| 4,246,252 | 1/1981 | McDermott et al. | 423/579 |
| 4,267,526 | 5/1981 | McDermott et al. | 372/89 |
| 4,318,895 | 3/1982 | Richardson et al. | 423/579 |
| 4,342,116 | 7/1982 | MacKnight et al. | 372/89 |
| 4,461,756 | 7/1984 | Rockenfeller | 423/579 |
| 4,558,451 | 12/1985 | McDermott et al. | 372/89 |
| 4,653,062 | 3/1987 | Davis et al. | 372/89 |
| 4,668,498 | 5/1987 | Davis | 423/579 |
| 4,780,880 | 10/1988 | Dickerson | 372/60 |
| 4,787,091 | 11/1988 | Wagner | 372/89 |
| 4,961,200 | 10/1990 | Verdier et al. | 372/89 |
| 4,975,265 | 12/1990 | Hed | 423/579 |
| 5,229,100 | 7/1993 | Harpole | 423/579 |
| 5,246,673 | 9/1993 | Hed | 422/224 |
| 5,378,449 | 1/1995 | Dinges | 423/579 |
| 5,392,988 | 2/1995 | Thayer, III | 239/102.2 |
| 5,417,928 | 5/1995 | McDermott | 422/120 |
| 5,516,502 | 5/1996 | Dickerson | 423/579 |
| 5,658,535 | 8/1997 | Thayer, III | 422/129 |
| 6,099,805 | 8/2000 | Hartlove | 422/122 |

FOREIGN PATENT DOCUMENTS

| | | |
|---|---|---|
| 19521688 | 12/1996 | Germany . |
| 63-249389 | 10/1988 | Japan . |

OTHER PUBLICATIONS

W. J. Thayer, et al., "Comparison of Predicted and Measured Output from a Transverse Flow Uniform Droplet Singlet Oxygen Generator", 25th AIAA Plasmadynamic and Lasers Conference, AIAA 94–2454, Jun. 20–23, 1994, Colorado Springs, CO.

Richardson, R.J. et al., "Chemically pumped iodine laser", *Appl.Phys.Lett.* 35(2), pp. 138–139 (1979).

Shimizu, K. et al., "HIgh–power stable chemical oxygen iodine Laser", *J.Appl.Phys.* 69(1), pp. 79–83 (1991).

*Primary Examiner*—Marian C. Knode
*Assistant Examiner*—Alexa A. Doroshenk
*Attorney, Agent, or Firm*—Michael S. Yatsko

[57] ABSTRACT

A singlet-delta oxygen generator 10 comprises a chamber 14 in which a gas stream 22 of singlet-delta oxygen, $O_2(^1\Delta)$, is generated; a water vapor trap 40 to remove water vapor from the gas stream, and a liquid separator 60 downstream of the water vapor trap to separate liquid from the gas stream subsequent to removal of the water vapor. The water vapor trap comprises a liquid droplet dispersing device 42 which forms a droplet field 44 of cold liquid droplets in the chamber. The cold liquid droplets interact with and condense water vapor in the gas stream. The cold liquid is preferably hydrogen peroxide. The liquid separator comprises a baffle 62 arrangement which forms a tortuous flow path for the gas stream. Liquid in the gas stream is unable to traverse the baffles and is separated from the liquid, to produce an essentially dry gas stream for introduction into a gain generator 34 downstream of the singlet-delta oxygen generator.

29 Claims, 2 Drawing Sheets

WATER VAPOR TRAP AND LIQUID SEPARATOR FOR SINGLET-DELTA OXYGEN GENERATOR

BACKGROUND

The invention relates to the field of chemical lasers and, more particularly, to a water vapor trap and liquid separator for use in a singlet-delta oxygen generator.

The chemical oxygen-iodine laser (COIL) is a high-energy chemically pumped continuous wave (cw) laser which utilizes electronic transitions between different states of atomic iodine. The COIL can produce continuous high power waves and good beam quality due to low pressure operation.

The overall process in the COIL involves the liquid phase generation and flow of electronically excited molecular, singlet-delta oxygen, $O_2(^1\Delta)$, into the gaseous phase. This is followed by electronic energy transfer to metastable atomic iodine to produce the excited state of atomic iodine.

$O_2(^1\Delta)$ is produced in the singlet-delta oxygen generator by a chemical reaction between basic hydrogen peroxide (BHP), $HO_2^-$, and chlorine gas, $Cl_2$. Resonant energy transfer from $O_2(^1\Delta)$ produces excited state atomic iodine $I(P_{1/2})$ and a population inversion in the gain generator of the COIL:

$$O_2(^1\Delta)+I(P_{3/2}) \rightarrow O_2(^3\Sigma)+I(P_{1/2}) \qquad (1)$$

The ground state iodine atoms for reaction (1) can be produced by the dissociation of molecular iodine, $I_2$, introduced into a flow stream of $O_2(^1\Delta)$ in the gain generator. The transition between the first electronically excited state of atomic iodine and the ground state generates a photon at 1.315 μm:

$$I(P_{1/2}) \rightarrow I(P_{3/2})+h\nu(1.315 \ \mu m) \qquad (2)$$

The flow stream of gaseous °2($^1$A) produced in the singlet-delta oxygen generator also comprises other gases and liquids which can be detrimental to laser beam quality and power. The gas stream typically comprises water vapor which can particularly adversely affect the laser beam. As the percentage of water vapor increases in the flow stream, the laser power decreases. Above about 10% water vapor, the laser power can be reduced to essentially zero. Accordingly, it is important to reduce the amount of water vapor to achieve satisfactory laser power.

Known cold traps for removing water vapor from gaseous $O_2(^1\Delta)$ produced in singlet-delta oxygen generators include chilled fins over which the gas stream is passed to condense the water vapor. This approach is less than totally satisfactory. Particularly, the fin configurations can be relatively large and heavy. Accordingly, fins are undesirable for use in airborne applications where space is limited and light weight is important to reduce fuel consumption. In addition, the channels defined by the fins become clogged by the ice formed when the water vapor in the gas stream is chilled. This ice formation reduces gas flow through the fins. The ice can also become entrained in the gas flow into the gain generator and reduce laser power.

It is also important to remove the gas-entrained liquids in the $O_2(^1\Delta)$ gas stream to prevent the liquids from entering the gain generator.

Thus, there is a need for a vapor trap and liquid separator for use in a singlet-delta oxygen generator that (i) effectively removes water vapor from the $O_2(^1\Delta)$ gas stream without the problems of ice formation and clogging; and (ii) has reduced size and weight; and (iii) effectively separates liquids from the $O_2(^1\Delta)$ gas stream.

SUMMARY

The present invention provides a singlet-delta oxygen generator that satisfies the above needs. A singlet-delta oxygen generator according to the present invention comprises a chamber in which a gas stream of singlet-delta oxygen, $O_2(^1\Delta)$, is generated, a source of a cold liquid, and a liquid droplet dispersing device in communication with the source and disposed to form a droplet field of the cold liquid in the chamber. The gas stream interacts with the cold liquid such that water vapor contained in the gas stream is condensed. The condensed water vapor and the cold liquid of the droplet field are collected in a collector. The droplet field is typically substantially vertical and substantially transverse to the direction of flow of the gas stream in the chamber. The collector is disposed below the droplet field such that the condensed water vapor and the cold liquid flow into the collector under gravity flow. The cold liquid effectively condenses the water vapor such that the gas stream downstream of the droplet field comprises less than about 1 vol. % water vapor, significantly reducing any effects on the laser power.

The liquid used to form the droplet field can be a suitable liquid having a sufficiently low freezing point and vapor pressure to form a droplet field and effectively condense the water vapor. The cold liquid preferably is also chemically compatible with basic hydrogen peroxide and not significantly reactive with $Cl_2$, which are reacted to form $O_2(^1\Delta)$ in the chamber. An excellent liquid is hydrogen peroxide.

The hydrogen peroxide in the droplet field typically has a temperature of less than about −20° C. The liquid droplet dispersing device produces a substantially uniform dispersion of cold liquid droplets having a typical diameter of from about 200 μm to about 400 μm.

The singlet-delta oxygen generator can further comprise a circulation loop external to the chamber for recirculating the cold liquid from the collector to the liquid droplet dispersing device. The recirculated liquid can be reintroduced as a droplet field into the chamber. A heat exchanger is provided in the circulation loop to cool the collected cold liquid prior to reintroduction into the chamber.

A liquid separator is disposed in the chamber downstream of the liquid droplet dispersing device to separate liquid from the gas stream subsequent to condensation of the water vapor. The gas stream typically comprises gaseous ground state oxygen and $O_2(^1\Delta)$ He, $Cl_2$, $H_2O$ and $H_2O_2$, and may also contain as impurities basic hydrogen peroxide (BHP) and hydrogen peroxide aerosols. The liquid separator comprises a plurality of baffles which form a tortuous flow path through which the gas stream of °2($^1$A) is passed. Liquid in the gas stream is unable to traverse the tortuous flow path and is separated by the baffles.

Thus, disadvantages of known singlet-delta oxygen generators are overcome in that the present invention (i) effectively removes water vapor and liquids from the singlet-delta oxygen gas stream; and (ii) has reduced weight.

BRIEF DESCRIPTION OF DRAWINGS

These and other features, aspects and advantages of the present invention will become better understood from the following description, appended claims and accompanying drawings, in which:

DETAILED DESCRIPTION OF THE INVENTION

Figure 1:
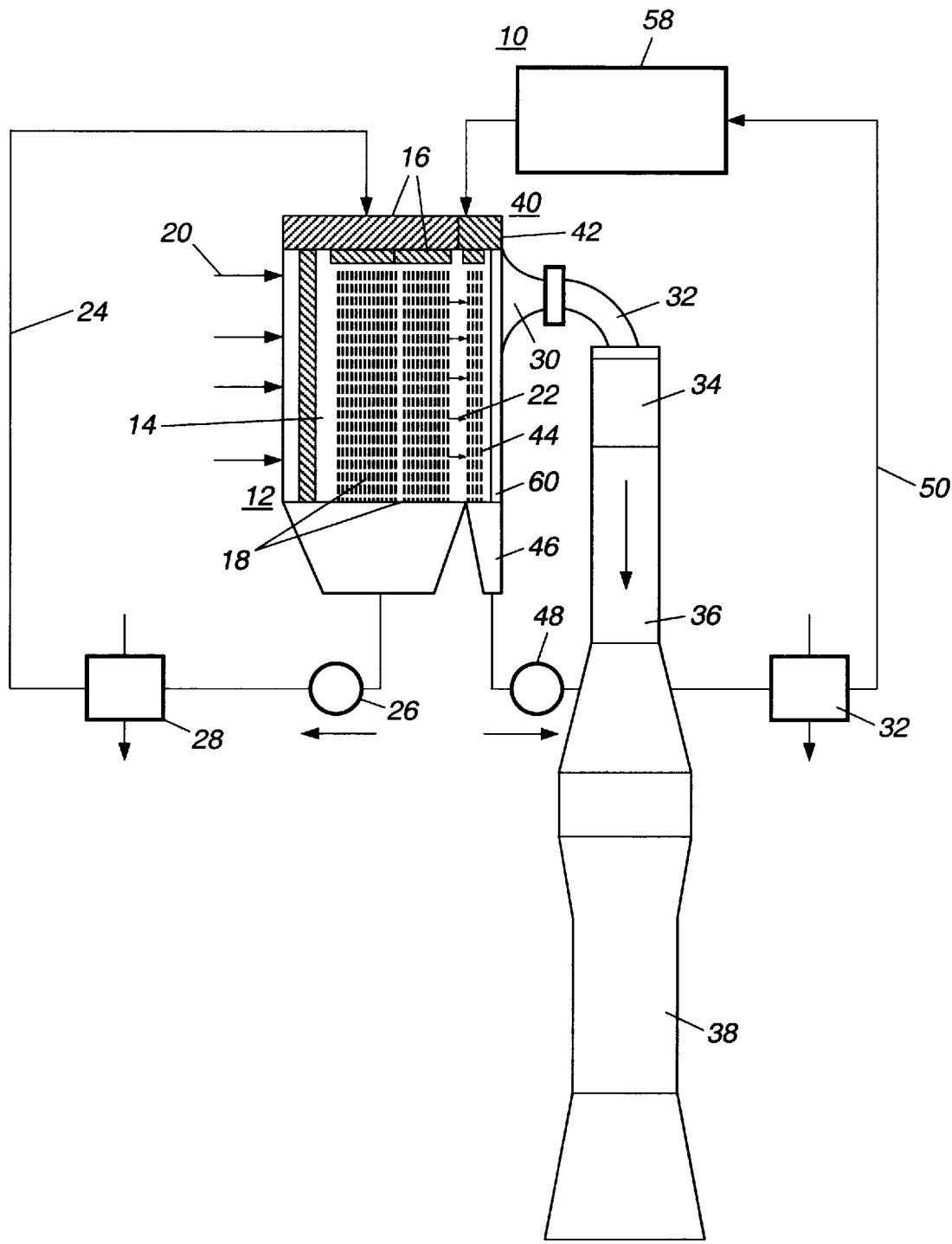
FIG. 1 is an illustrational view of a chemical oxygen-iodine laser including a water vapor trap and liquid separator according to the present invention.

The present invention is a water vapor trap and liquid separator for use in a singlet-delta oxygen, $O_2(^1\Delta)$, generator (SOG) 10. FIG. 1 illustrates a chemical oxygen-iodine laser (COIL) including a singlet-delta oxygen generator 12, in which $O_2(^1\Delta)$ is produced from the reaction of basic hydrogen peroxide (BHP), $HO_2^-$, and a halogen gas species, typically $Cl_2$. The halogen gas is introduced into the singlet-delta oxygen generator 12 in a halogen gas/inert gas mixture. The inert gas is typically He. BHP is introduced into a chamber 14 of the singlet-delta oxygen generator 12 at inlets 16 in the form of a liquid droplet dispersion 18. A halogen gas/inert gas mixture 20 is introduced into the chamber 14 transverse to the BHP droplets 18 to produce $O_2(^1\Delta)$ in a gas stream 22. The BHP can be continuously recirculated around a closed loop 24 and reintroduced into the chamber 14. The closed loop 24 includes a pump 26 and a heat exchanger 28 to cool the BHP before reintroduction into the chamber 14. The singlet-delta oxygen generator 12 comprises an outlet 30 through which the $O_2(^1\Delta)$ gas stream 22 exits the chamber 14. The $O_2(^1\Delta)$ gas stream is flowed via a conduit 32 to a gain generator 34 disposed downstream of the singlet-delta oxygen generator 12. Photons are generated in the gain generator 34 by mixing and reacting the $O_2(^1\Delta)$ gas stream with iodine. The photons are caused to oscillate in the laser resonator cavity (not shown) to form the laser beam. A diffuser 36 and an ejector 38 in communication with the gain generator 34 pass the laser effluent.

The $O_2(^1\Delta)$ gas stream 22 typically also comprises other gases including residual $Cl_2$, He and water vapor. The water vapor is highly detrimental to laser power if too much is contained in the $O_2(^1\Delta)$ gas stream 22. In fact, a water vapor content of more than about 10 vol. % in the $O_2(^1\Delta)$ gas stream can reduce laser power to essentially zero. The water vapor content is preferably maintained below about 1 vol. % to achieve satisfactory laser power.

According to the present invention, a water vapor trap 40 is provided in the singlet-delta oxygen generator 12 to reduce the water vapor content of the $O_2(^1\Delta)$ gas stream 22 to an effective low level to achieve satisfactory laser power. Preferably, the water vapor trap 40 reduces the water vapor content of the $O_2(^1\Delta)$ gas stream 22 to less than about 1 vol. %. The water vapor trap 40 comprises a liquid droplet dispersing device 42 for forming a droplet field 44 of a cold liquid in the chamber 14, such that the $O_2(^1\Delta)$ gas stream 22 is passed through the droplet field 44. The cold liquid droplets interact with and condense the water vapor in the $O_2(^1\Delta)$ gas stream.

The dispersed cold liquid and condensed water vapor flow downward under gravity flow into a collector 46 disposed at the lower portion of the singlet-delta oxygen generator 12. The cold liquid is preferably continuously recirculated by a pump 48 in a closed loop 50 from the collector 46 to the liquid droplet dispersing device 42. The recirculated cold liquid is reintroduced into the chamber 14 as a droplet field 44 to again condense water vapor in the $O_2(^1\Delta)$ gas stream. A heat exchanger 52 in the closed loop 50 maintains the cold liquid at an effective low temperature to condense the water vapor. Typically, the collected cold liquid warms only several degrees in the chamber 14.

Figure 2:
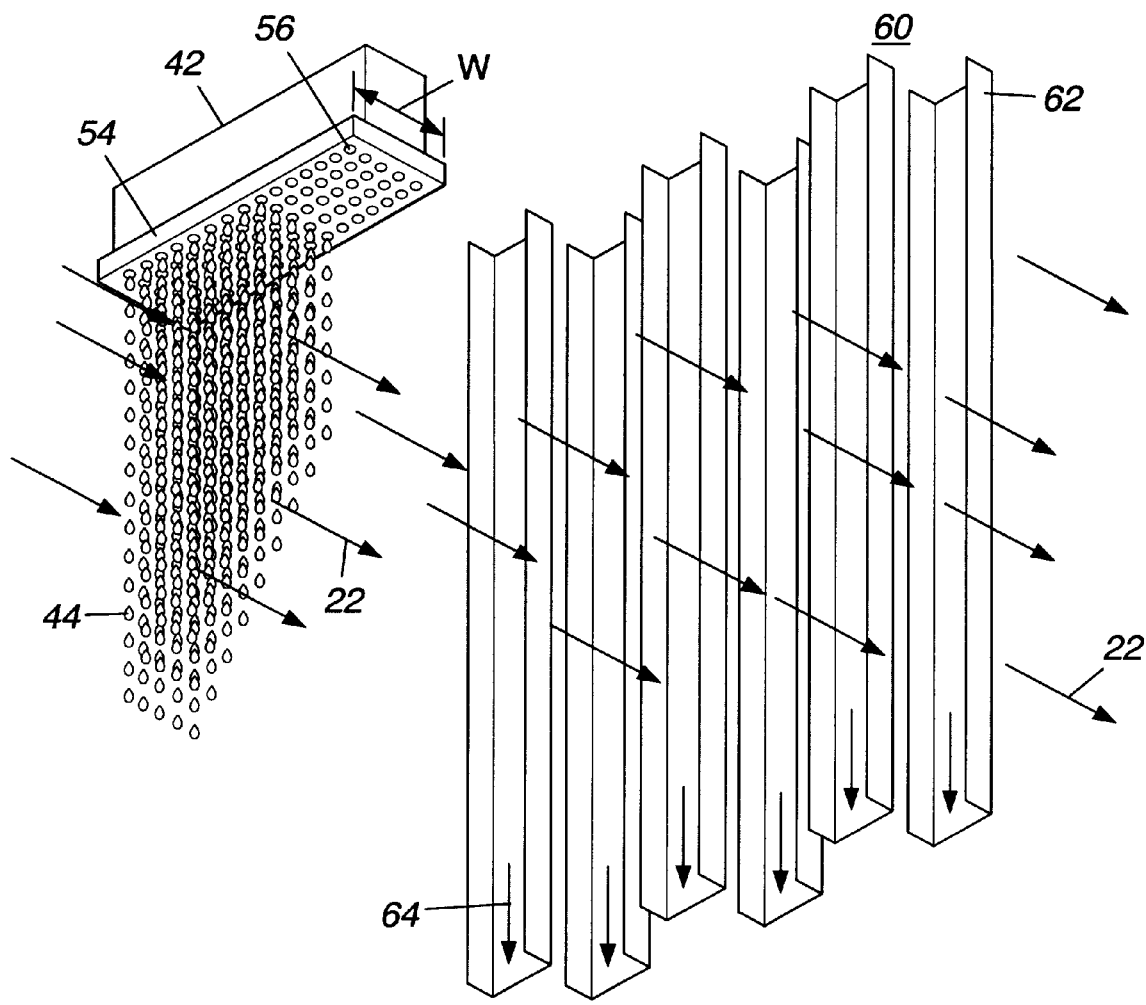
FIG. 2 is an illustrational view showing the flow of the singlet-delta oxygen gas stream through the droplet field of the water vapor trap and through the baffle arrangement of the liquid separator.

The liquid droplet dispersing device 42 can be any suitable device that produces a high-density, uniform dispersion of cold liquid droplets. As shown in FIG. 2, the dispersing device 42 can comprise a porous plate 54 defining small holes 56 through which the cold liquid is forced to produce the droplet field 44. Droplets are shown over only a portion of the porous plate 54 for clarity. The dispersing device 42 can optionally comprise one or more spray nozzles, atomizers or the like (not shown). The droplets typically have a diameter of from about 200 μm to about 400 μm. The droplet field 44 typically has a width in the direction of the $O_2(^1\Delta)$ gas stream of less than about 5 cm. This is approximately equal to the width, W, of the porous plate 54. Such droplet field width is advantageous to increase interaction between the droplets and water vapor to effectively condense the water vapor.

As used herein, the term "cold liquid" means a liquid that is at an effectively low temperature so that the vapor pressure of the liquid is effectively low to condense the water vapor in the $O_2(^1\Delta)$ gas stream 22. An excellent liquid for forming the droplet field is aqueous hydrogen peroxide, $H_2O_2$. $H_2O_2$ droplets can be introduced into the chamber 14 at a temperature of less than about −20° C. to condense the water vapor. $H_2O_2$ also has a low freezing point, chemical compatibility with BHP and is not significantly chemically reactive with $Cl_2$.

$H_2O_2$ can be used in a water solution at a concentration of from about 30% to about 60%. A source 58 of $H_2O_2$ supplies additional $H_2O_2$ into the closed loop 50 as necessary to maintain an effective concentration during operation.

Other liquids having similar properties to $H_2O_2$ are also considered suitable for use in the water vapor trap 40. Such other liquids include, for example, lithium halide salts.

The $O_2(^1\Delta)$ gas stream 22 downstream of the water vapor trap 40 comprises gaseous ground state oxygen, $O_2(^1\Delta)$, He, $Cl_2$, $H_2O$ and $H_2O_2$, and may also contain as impurities BHP and $H_2O_2$ aerosols. It is desirable to form an essentially dry gas in the singlet-delta oxygen generator 12 to significantly reduce the amount of liquid introduced into the gain generator 34, so as to reduce detrimental effects on the laser beam power and quality.

The singlet-delta oxygen generator 12 comprises a liquid separator 60 disposed downstream of the water vapor trap 40 to remove liquids from the $O_2(^1\Delta)$ gas stream 22 prior to exiting through the outlet 30. As shown in FIG. 2, the liquid separator 60 can comprise a baffle arrangement. The baffles 62 can have an elongated, generally U-shaped configuration. Other baffle shapes and configurations such as wave plates can optionally be used. The baffles 62 are positioned in the chamber in a staggered array, forming a tortuous flow path for the $O_2(^1\Delta)$ gas stream 22. The baffles 62 are typically oriented in a substantially vertical orientation in the chamber 14. The liquids in the $O_2(^1\Delta)$ gas stream 22 are unable to traverse the tortuous flow path and collide with the baffles 62. The liquids flow downwardly along the baffles 62 as depicted by arrows 64 and into the collector 46. Consequently, the $O_2(^1\Delta)$ flow stream 22 is essentially dry as it is introduced into the gain generator 34.

The baffles 62 are preferably formed of a lightweight material that has corrosion resistance to the liquids and gases typically present in the singlet-delta oxygen generator. For example, the baffles 62 can be comprised of polymeric materials such as plastics.

The singlet-delta oxygen generator 12 can be used to generate $O_2(^1\Delta)$ for applications other than flowing gas chemical lasers. For example, $O_2(^1\Delta)$ can also be used in waste treatment, water purification and the formation of oxygenated chemical compounds.

Although the present invention has been described in considerable detail with reference to certain preferred embodiments thereof, other embodiments are possible. Therefore, the scope of the appended claims should not be limited to the description of the preferred embodiments contained herein.

What is claimed is:

1. A single-delta oxygen generator, comprising:
   (a) a chamber generating a gas stream of singlet-delta oxygen, the chamber including a first droplet field and a second droplet field;
   (b) a first circulation loop for circulating a first liquid forming the first droplet field, the first droplet field generating the gas stream of singlet-delta oxygen, the first circulation loop including a liquid inlet, a first collector and a first recirculation path; and
   (c) a second circulation loop for circulating a second liquid forming the second droplet field, the second droplet field interacting with the gas stream such that water vapor contained in the gas stream is condensed, the second circulation loop including a source of the second liquid, a water vapor trap, a second collector and a second recirculation path, wherein the second collector collects the second liquid after the gas stream has passed through the second droplet field, and wherein the water vapor trap reduces the water vapor content of the collected second liquid.

2. The singlet-delta oxygen generator of claim 1, wherein the first liquid is basic hydrogen peroxide.

3. The singlet-delta oxygen generator of claim 1, wherein the water vapor trap further includes a liquid droplet dispersing device for producing a substantially uniform dispersion of second liquid droplets having a diameter of from about 200 um to about 400 um in order to increase the interaction between the water vapor and the gas stream generated in the first droplet field when the gas stream passes through the second droplet field.

4. The singlet-delta oxygen generator of claim 1, wherein the first and second droplet fields are substantially transverse to the direction of flow of the gas stream in the chamber.

5. The singlet-delta oxygen generator of claim 1, wherein the second droplet field has a width in the direction of flow of the gas stream of less than 5 cm.

6. The singlet-delta oxygen generator of claim 1, wherein the first recirculation path recirculates the first liquid from the first collector to the liquid inlet to enable reintroduction of the first liquid into the chamber as a droplet field.

7. The singlet-delta oxygen generator of claim 1, wherein the first recirculation path comprises a heat exchanger for cooling the collected first liquid prior to reintroduction into the chamber.

8. The singlet-delta oxygen generator of claim 1, wherein the second liquid is selected from the group consisting of aqueous hydrogen peroxide and lithium halide salts.

9. The singlet-delta oxygen generator of claim 1, wherein the second recirculation path recirculates the second liquid from the second collector to the water vapor trap to enable reintroduction of the second liquid into the chamber as the second droplet field.

10. The singlet-delta oxygen generator of claim 1, wherein the second recirculation path includes a heat exchanger for cooling the collected second liquid prior to being reintroduced into the chamber.

11. A singlet-delta oxygen generator, comprising:
   (a) a chamber generating a gas stream of singlet-delta oxygen, the chamber including first and second droplet fields;
   (b) a first circulation loop for circulating a first liquid forming the first droplet field, the first droplet field generating the gas stream of singlet-delta oxygen, the first circulation loop including a liquid inlet, a first collector and a first recirculation path; and
   a second circulation loop for circulating a second liquid forming the second droplet field, the second droplet field interacting with the gas stream such that water vapor contained in the gas stream is condensed, the second circulation loop including a source of the second liquid, a water vapor trap, a second collector and a second recirculation path, wherein the water vapor trap reduces the water vapor content of the gas stream, the water vapor trap including:
   a liquid droplet dispersing device in communication with the source of the second liquid for producing a substantially uniform dispersion of second liquid droplets in order to increase the interaction between water vapor and the gas stream generated in the first droplet field when the gas stream passes through the second liquid droplet field; and
   a liquid separator disposed in the chamber downstream of the liquid droplet dispersing device to separate liquid from the gas stream subsequent to interacting with the second droplet field.

12. The singlet-delta oxygen generator of claim 11, wherein the first liquid is basic hydrogen peroxide.

13. The singlet-delta oxygen generator of claim 11, wherein the second liquid droplets generated by the liquid droplet dispersing device has a diameter of from about 200 um to about 400 um.

14. The singlet-delta oxygen generator of claim 11, wherein the second droplet field has a width in the direction of flow of the gas stream of less than about 5 cm.

15. The singlet-delta oxygen generator of claim 11, wherein the first and second droplet fields are substantially transverse to the direction of flow of the gas stream in the chamber.

16. The singlet-delta oxygen generator of claim 11, wherein the second collector collects the condensed water vapor and the second liquid in order to recirculate the second liquid from the second collector to the liquid droplet dispersing device to enable reintroduction of the second liquid into the chamber as a droplet field.

17. The singlet-delta oxygen generator of claim 11, wherein the first recirculation path comprises a heat exchanger for cooling the collected first liquid prior to reintroduction into the chamber.

18. The singlet-delta oxygen generator of claim 11, wherein the liquid separator comprises a plurality of baffles disposed in the chamber to form a tortuous flow path through which the gas stream of singlet-delta oxygen is passed to remove liquid from the gas stream.

19. The singlet-delta oxygen generator of claim 11, wherein the second liquid is selected from the group consisting of aqueous hydrogen peroxide and lithium halide salts.

20. The singlet-delta oxygen generator of claim 11, wherein the second recirculation path further comprises a heat exchanger for cooling the collected second liquid prior to being reintroduced into the chamber.

21. A singlet-delta oxygen generator, comprising:
   (a) a chamber for generating a gas stream of singlet-delta oxygen, the chamber including first and second droplet fields;
   (b) a first circulation loop for circulating a fluid forming the first droplet field, the first droplet field generating the gas stream of singlet-delta oxygen, the first circulation loop including a liquid inlet, a first collector and a first recirculation path; and (c) a second circulation loop including:
   (i) a source of the second liquid;
   (ii) a liquid droplet dispersing device in communication with the source of second liquid, and for forming the second droplet field of the second liquid in the chamber substantially transverse to the direction of flow of the gas stream, the gas stream interacting with the second droplet field such that water vapor contained in the gas stream is condensed;
   (iii) a second collector disposed to collect the condensed water vapor and the second liquid;
   (iv) a second recirculation path for recirculating the second liquid from the second collector to the second liquid droplet dispersing device to enable reintroduction of the second liquid into the chamber as a droplet field; and
   (v) a liquid separator disposed in the chamber downstream of the second liquid droplet dispersing device to separate water vapor from the gas stream subsequent to interacting with said second droplet field.

22. The singlet-delta oxygen of claim 21, wherein the first liquid is basic hydrogen peroxide.

23. The singlet-delta oxygen generator of claim 21, wherein the second liquid droplet dispersing device forms a substantially uniform dispersion of second liquid droplets having a diameter of from about 200 um to about 400 um.

24. The singlet-delta oxygen of claim 21, wherein the second droplet field has a width in the direction of flow of the gas stream of less than about 5 cm.

25. The singlet-delta oxygen generator of claim 21, wherein the first recirculation path further comprises a heat exchanger for cooling the first liquid prior to reintroduction into the chamber.

26. The singlet-delta oxygen generator of claim 21, wherein the liquid separator comprises a plurality of baffles disposed in the chamber to form a tortuous flow path through which the gas stream of singlet-delta oxygen is passed to remove liquid from the gas stream.

27. The singlet-delta oxygen generator of claim 21, wherein the second liquid is selected from the group consisting of aqueous hydrogen peroxide and lithium halide salts.

28. The singlet-delta oxygen generator of claim 21, wherein the second recirculation path further comprises a heat exchanger for cooling the collected second liquid prior to being reintroduced into the chamber.

29. A method of treating a gas stream of singlet-delta oxygen in a chamber of a singlet-delta oxygen generator, wherein the singlet-delta oxygen generator includes first and second droplet fields, the method comprising:

(a) uniformly dispersing a first liquid forming the first droplet field in order to generate the gas stream of singlet-delta oxygen;

(b) separating the first liquid from the gas stream prior to passing the gas stream into the second droplet field;

(c) passing the gas stream of singlet-delta oxygen through a second droplet field of the second liquid in the chamber, the gas stream interacting with the second droplet field such that water vapor contained in the gas stream is condensed; and (d) separating condensed water vapor and the second liquid from the gas stream subsequent to interacting with the second droplet field.

* * * * *